US006939526B2

(12) United States Patent
Fukuda et al.

(10) Patent No.: US 6,939,526 B2
(45) Date of Patent: Sep. 6, 2005

(54) GRAPHITE PARTICLES AND PROCESS FOR PRODUCTION THEREOF

(75) Inventors: Kenji Fukuda, Fukuoka (JP); Tadanori Tsunawaki, Fukuoka (JP); Tatsuo Umeno, Fukuoka (JP); Kohei Murayama, Fukuoka (JP); Youichiro Hara, Fukuoka (JP)

(73) Assignee: Mitsui Mining Co., Ltd., Tokyo (JP)

( * ) Notice: Subject to any disclaimer, the term of this patent is extended or adjusted under 35 U.S.C. 154(b) by 106 days.

(21) Appl. No.: 10/152,789

(22) Filed: May 23, 2002

(65) Prior Publication Data

US 2002/0197201 A1 Dec. 26, 2002

(30) Foreign Application Priority Data

May 28, 2001 (JP) ........................................ 2001-158801

(51) Int. Cl.[7] ............................................. C01B 31/04
(52) U.S. Cl. .................. 423/448; 423/445 R; 423/460; 429/231.8
(58) Field of Search ............................ 423/448, 445 R, 423/460; 429/231.8

(56) References Cited

U.S. PATENT DOCUMENTS

| | | | |
|---|---|---|---|
| 6,139,990 A | 10/2000 | Kubota et al. ............ | 429/231.8 |
| 6,156,432 A | * 12/2000 | Mabuchi et al. ............ | 428/408 |
| 6,344,296 B1 | * 2/2002 | Ishii et al. ............... | 429/231.8 |
| 6,432,583 B1 | 8/2002 | Fukuda et al. ............ | 429/231.4 |
| 2001/0051300 A1 | * 12/2001 | Moriguchi et al. ....... | 429/231.8 |

FOREIGN PATENT DOCUMENTS

| | | |
|---|---|---|
| EP | 0 890 549 | 1/1999 |
| EP | 0 977 292 | 2/2000 |
| JP | 08315820 | * 11/1996 |
| WO | WO 02/34670 | 5/2002 |

OTHER PUBLICATIONS

Ugarte, Daniel "Curling and closure of graphitic networks under electron–beam irradiation", Oct. 22, 1992, Nature, vol. 359, pp. 707–709.*
Yamada et al. "Morphology of Carbon Particles Formed by the Conically Converging Shock–Wave Technique", Oct. 1, 1988 Journal of Crystal Growth, vol. 92, pp. 143–149.*
Chen et al. "Nanoporous carbon produced by ball–milling", Applied Physics Letters, vol. 74, No. 19, 2782–2784.*
X. H. Chen, et al., Journal of Crystal Growth, vol. 218, no. 1, XP–004214610, pp. 57–61, "Generation of Curved or Closed–Shell Carbon Nanostructures by Ball–Milling of Graphite", Sep. 2000.

* cited by examiner

Primary Examiner—Stanley S. Silverman
Assistant Examiner—Peter J Lish
(74) Attorney, Agent, or Firm—Oblon, Spivak, McClelland, Maier & Neustadt, P.C.

(57) ABSTRACT

Graphite particles having a bent laminate structure inside each particle are produced by feeding, into an impact grinder, graphite particles having an average particle diameter of 5 mm or less together with a gas current to apply an impact to the graphite particles to form, by a compression force, a bent laminate structure inside each graphite particle. The resulting graphite particles have an average particle diameter of 100 μm or less, are low in anisotropy, have a nearly spherical shape, and are highly crystalline.

7 Claims, 6 Drawing Sheets

GRAPHITE PARTICLES AND PROCESS FOR PRODUCTION THEREOF

BACKGROUND OF THE INVENTION

1. Field of the Invention

The present invention relates to nearly spherical graphite particles suitably used as an anode material for lithium secondary battery, a separator material for fuel cell, etc., as well as to a process for production thereof.

2. Description of the Prior Art

Graphite particles have found wide applications as an anode material for lithium secondary battery, a separator material for fuel cell, etc. The raw materials for the graphite particles used in such applications are natural graphite and artificial graphite.

Graphite particles obtained by grinding natural graphite show striking anisotropy in particle shape, owing to the crystal structure. The particle shape of such graphite particles is scaly (plate-like). That is, the crystals of the graphite particles have a structure constituted by a number of large AB planes laminated in the C axis direction. Since each AB plane has a large area while the laminate thickness in the C axis direction is small, the particle shape is plate-like as a whole.

The anode of lithium secondary battery is generally constituted by a collector (e.g. a copper foil) and a thin graphite layer covering the surface of the collector. In order to allow a lithium secondary battery to have large charge and discharge capacities, the graphite layer is preferred to have a high density. Therefore, the graphite layer is generally compressed using a press, a roll or the like to obtain a higher density.

When, in producing an anode using graphite particles obtained from natural graphite, the graphite layer on the collector is compressed using a press, a roll or the like, however, the graphite particles of the graphite layer are orientated so that each AB plane of the graphite particles becomes parallel to the compressed surface of the graphite layer because each graphite particle is a thin scale (a thin plate).

That is, each plate-like graphite particle constituting the graphite layer is orientated so that its AB planes become parallel to the surface of the collector. Hereinafter, such orientation of graphite particles in graphite layer is called simply "orientation".

Orientation of graphite particles in the anode of battery is not preferred. The reasons are as follows. Firstly, since the electrolytic solution in battery is unable to pass thorough each AB planes of graphite particles, the electrolytic solution penetrates hardly into the graphite layer of anode wherein the graphite particles are orientated. As a result, the contact between graphite and electrolytic solution is restricted only to the surface of the graphite layer or its vicinity. Next, the conductivity of graphite crystals is large within the AB plane and small in the C axis direction. Meanwhile, the direction of flow of electricity in the graphite layer is the thickness direction of the graphite layer. This direction agrees to the C axis direction of the orientated graphite particles. Therefore, the electric resistance of the anode becomes large. As a result, the charge and discharge capacities of the battery become small.

The separator of fuel cell is produced by molding a mixture of particulate graphite and a resin into a plate shape using a press. The main function of the separator is to separate the flow of a fuel gas and the flow of an oxygen-containing gas from each other so as to prevent the mixing of the two gases. The separator also has a function as a collector; in this case, electricity flows in the separator in its thickness direction. Therefore, appearance of orientation in the separator is not preferred as in the anode material for lithium secondary battery.

Also in the graphite electrodes used for other applications, orientation appears often.

Artificial graphite can be produced as nearly spherical particles, depending upon the production process. It can also be produced as particles low in anisotropy. Artificial graphite can be produced, for example, as spherical graphite particles having a structure in which disc-shaped graphite plates different in radius are laminated in the C axis direction, or as columnar graphite particles having a structure in which disc-shaped graphite plates equal in radius are laminated in the C axis direction.

Such artificial graphite, however, is generally expensive and low in crystallinity. Use of artificial graphite low in crystallinity as an anode material is not preferred because such graphite is small in charge and discharge capacities per unit mass of graphite.

Use of artificial graphite low in crystallinity as a material for separator is not preferred, either, because such graphite has low conductivity.

Meanwhile, artificial graphite high in crystallinity has properties close to those of natural graphite. Therefore, artificial graphite high in crystallinity, when ground, becomes scaly particles as in the case of natural graphite.

SUMMARY OF THE INVENTION

In order to obtain graphite particles low in anisotropy, the present inventors tried to grind highly crystalline graphite using a number of different grinders.

The primary crushers for obtaining graphite particles having an average particle diameter of 100 µm or more include a jaw crusher, a gyratory crusher, a roll crusher, etc.

The fine grinding mill for obtaining graphite particles having an average particle diameter of 100 µm or less include a roller mill, a rotary disc mill, a pan mill, a ring roll mill, an impact crusher, a vibration rod mill, a vibration disc mill, a vibration ball mill, a ball mill, a jet mill, etc.

All of these crushers or mills can give a strong shear force, a strong compression force and a strong impact and therefore can grind graphite in a short time. In many cases, however, the graphite particles obtained by grinding are scaly.

Graphite of high crystallinity is fundamentally formed in a structure in which a large number of networks of carbon atoms, i.e. a large number of AB planes are laminated in a large thickness in the form of a lump. The bonding force between AB planes (the bonding force in the C axis direction) is far smaller than the bonding force within each AB plane. Therefore, in grinding of graphite, peeling between AB planes takes place preferentially unless a special countermeasure is taken in the grinding, and the resulting graphite particles are scaly.

The inner construction of each graphite particle can be observed by an electron microscope. By observing, in particular, the graphite section vertical to the AB planes of graphite, a plurality of streaks showing a laminate structure can be seen.

The inner construction of each scaly graphite particle is simple when observed by an electron microscope. When the graphite section vertical to the AB planes of graphite is observed, it is appreciated that the streaks showing a laminate structure are always linear and each scaly graphite particle is a laminate of plate-like graphite layers.

The inner construction which is such a laminate, is hereinafter called "laminate structure".

The present inventors found out that when graphite is finely ground using a vibration rod mill, a vibration disc mill or a vibration ball mill, spindle-like graphite particles are obtained exceptionally. This occurs because not only grinding but also compression molding are conducted, and the phenomenon is particularly striking when a vibration rod mill is used.

Even in the spindle-like graphite particles, a linear laminate structure is seen when their inner construction is observed by an electron microscope, and the AB planes of each graphite particle are approximately parallel to the length of the particle. That is, although the appearance of the graphite particles is spindle-like (changed from scaly), there is no change in the inner construction. Therefore, the spindle-like graphite particles is unlikely to give rise to orientation as compared with the scaly graphite particles; however, they have not solved sufficiently the above-mentioned problems associated with orientation.

The present inventors ground highly crystalline graphite using various grinders in various grinding methods and investigated the change in inner construction by grinding. As a result, the present inventors found out that there was a change in the inner construction of graphite particles when an impact grinder having a relatively small grinding power was used. That is, a linear laminate structure changed to a curved laminate structure.

It was also found out that, when a gas current was fed into the grinder together with the raw material graphite, the change to a curved laminate structure was striking. It was further found out that, by repeating the above grinding operation, spherical graphite particles could be obtained.

Furthermore, examination of the properties of the spherical graphite particles revealed that these graphite particles were intended graphite particles. Based on these findings, the present invention has been completed.

Hence, the present invention aims at obtaining nearly spherical graphite particles and also obtaining graphite particles essentially low in anisotropy, from highly crystalline graphite.

The present invention is as follows.

[1] Graphite particles having an average particle diameter of 100 μm or less and, inside each particle, a bent laminate structure.

[2] Graphite particles according to [1], having a length-to-breadth ratio of 4 or less.

[3] Graphite particles according to [1], having a lattice constant Co (002) of 0.670 to 0.672 nm as measured by an X-ray diffractometer.

[4] Graphite particles according to [1], having an average particle diameter of 5 to 50 μm.

[5] Graphite particles according to [1], having a tap density of 0.6 to 1.4 g/cm$^3$.

[6] A graphite particles mixture having an average particle diameter of 100 μm or less, which comprises the graphite particles set forth in any of [1] to [5], in amount of 10% by mass or more.

[7] A process for producing graphite particles having a bent laminate structure inside each particle, which comprises feeding, into an impact grinder, graphite particles having an average particle diameter of 5 mm or less in the length direction, together with an air current to apply an impact to the graphite particles to form, by a compression force, a bent laminate structure inside each graphite particle.

The graphite particles of the present invention have each a bent laminate structure inside and a nearly spherical shape and, therefore, have anisotropy per se. Consequently, various molded materials produced from these graphite particles are unlikely to give rise to orientation. When the present graphite particles are used, for example, as an electrode material, an electrode of small electric resistance can be produced. Further, since the present graphite particles retain the high crystallinity of graphite, a graphite molded material retaining the excellent properties of highly crystalline graphite can be obtained from the present graphite particles.

According to the present process for producing graphite particles, graphite particles having a bent laminate structure can be easily produced by using a widely used impact grinder.

BRIEF DESCRIPTION OF THE DRAWINGS

In FIG. 1, numeral 1 refers to a metering feeder; numeral 2 refers to an impact grinder; numeral 3 refers to a bag filter; numeral 4 refers to a sieve; numeral 5 refers to a classifier; numeral 11 refers to raw material graphite; numerals 12, and 14 refer to air; numeral 13 refers to a mixture of ground graphite and air; numeral 15 refers to ground graphite; numeral 16 refers to oversize particles of ground graphite; numeral 17 refers to undersize particles of ground graphite; numeral 18 refers to spherical graphite particles; and numeral 19 refers to excessively ground fine graphite particles.

DETAILED DESCRIPTION OF THE INVENTION

In order to explain the change in the inner construction of graphite particles, a case is considered in which a scaly (plate-like) graphite particle receives a compression force parallel to the AB plane of the particle.

First, the scaly (plate-like) graphite particle is deformed into a curved plate shape by receiving a compression force parallel to the AB plane.

With the repeated receiving of the compression force, the deformation of the graphite particle becomes striking, the compression force acts so as to bend the particle plate, and the two inner surfaces of the bent plate come to face each other.

With the further receiving of the compression force, the compression force acts so as to allow the two facing inner surfaces to adhere to each other, and finally the scaly (plate-like) graphite particle becomes a folded state.

The deformation of each graphite particle in actual grinding is not simple as above and is considered to take place in a complicated manner. For example, when scaly graphite particles repeatedly receive a compression force parallel to their AB planes, the direction of the action of the compression force is not constant as above and each end of the scaly graphite particles is considered to receive a force which acts so as to round the end.

It is further considered that complicated changes take place also in the steps up to the grinding into scaly graphite particles or between graphite particles. It is considered that by repeatedly receiving compression forces in various ways, graphite particles gradually turn into spherical particles.

Observation of the graphite particles after actual compression treatment indicates that their appearance is nearly spherical. Observation of the inner construction of such graphite particles using an electron microscope indicates that many of the streaks showing a laminate structure are curved and the laminate structure is very complicated. Further, many voids are seen inside each particle.

Characteristically, when a randomly selected section of a graphite particle after compression treatment is observed, the presence of a laminate structure is always seen in the vicinity of the particle surface and, from the particle surface toward the particle center, a laminate structure curved along the roundness of the particle surface is seen.

That is, the graphite particles after compression treatment are nearly spherical particles and the crystal plane at each graphite particle surface is approximately an AB plane.

Herein, the change of linear laminate structure into curved laminate structure owing to compression force is called "bent".

The graphite particles of the present invention are characterized by having, inside each particle, a bent laminate structure formed by a compression force, and has a laminate structure of many bent layers in the vicinity of the particle surface.

As the impact grinder used for obtaining the graphite particles of the present invention, there can be mentioned, for example, a hammer mill and a pin mill. The pin mill is preferred particularly. The hammer mill has such a structure that a plurality of hammers is rotated inside a cylindrical casing. In this grinder, graphite particles are collided with each striking plate of hammer and each fixed plate to conduct grinding.

The pin mill has such a structure that a plurality of pins is rotated inside a cylindrical casing. In this grinder, graphite particles are collided with each rotating pin and each fixed pin to conduct grinding.

The rotation speed of the rotating hammers or pins is preferably smaller than in ordinary grinding, in order to apply a relatively small impact. The linear speed of the striking plate of hammer or the rotating pin is preferably about 50 to 200 m/sec.

The grinding of graphite is conducted preferably by allowing the graphite to be accompanied by a gas current. The feeding or discharging of graphite particles into or from grinder is conducted preferably by allowing the graphite particles to be accompanied by a gas (e.g. air) current.

In order to allow graphite particles to be accompanied by a gas current, the grinder preferably has such a structure that the raw material inlet is provided in the vicinity of the center of the shaft of the rotating hammers or rotating pins and the outlet of the ground material is provided at the outer circumference of the casing.

It is not certain why the grinding of graphite particles in the co-existence of a gas current is effective in production of the graphite particles of the present invention. However, it is considered that, when plate-like graphite particles are in a gas current, the plate direction thereof becomes parallel to the flow direction of the gas and when these plate-like graphite particles are collided with, for example, the rotating pins, each end of each plate receives an impact.

Therefore, the plate-like graphite particles receive, at the AB planes, a compression force parallel thereto. As a result, the plate-like graphite particles are considered to give rise to deformation as mentioned previously and turn gradually into spherical graphite particles.

In producing the graphite particles of the present invention, it is important to apply a relatively small impact repeatedly.

When grinding of graphite particles is conducted batchwise by allowing the graphite particles to be accompanied by a gas current, repeated grinding of at least 10 times is necessary, and this is troublesome in some cases.

Figure 1:
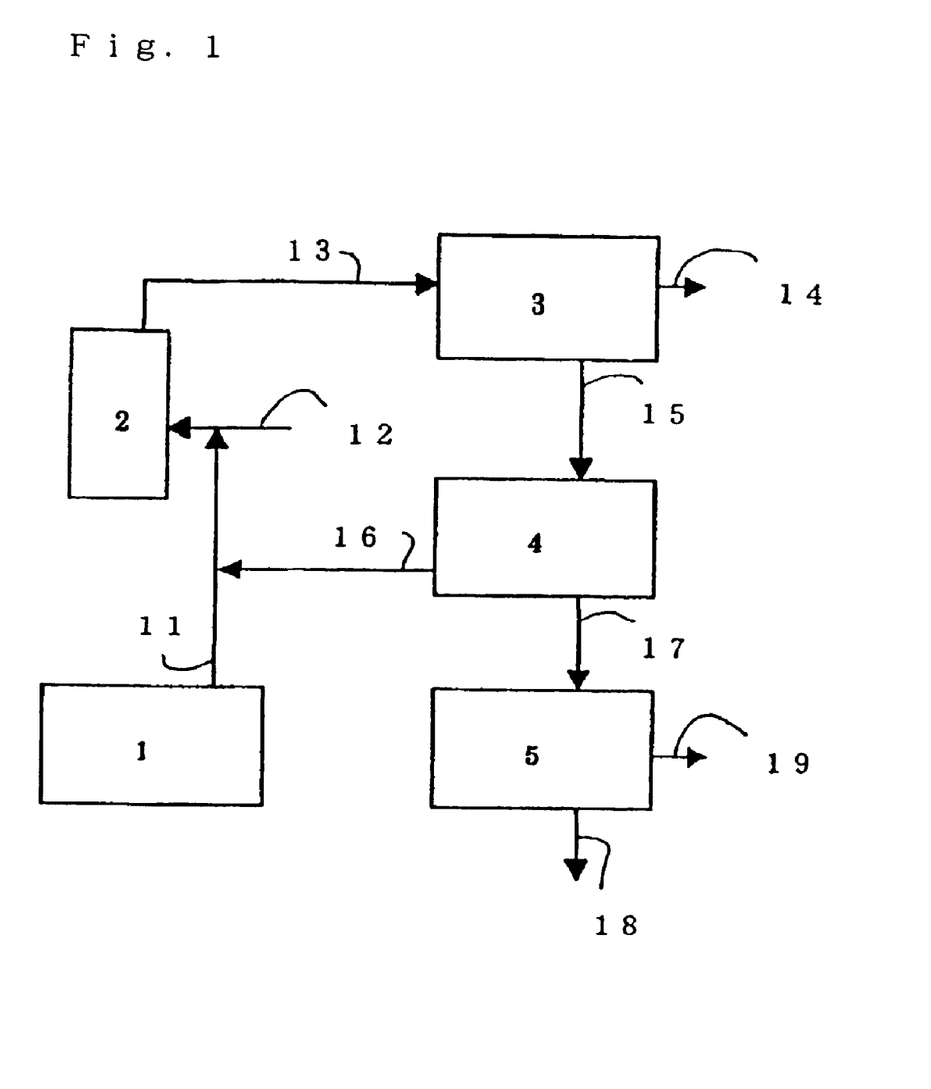
FIG. 1 is a flow chart showing an example of the present process for producing graphite particles.

However, continuous grinding is easy. An example of continuous grinding is shown in FIG. 1. A raw material graphite 11 metered by a metering feeder 1 is transferred by air 12 and fed into an impact grinder 2 together with the air. The mixture of ground graphite and air 13 is sent into a bag filter 3, wherein separation into ground graphite and air is made. Air 14 is discharged outside. The ground graphite 15 separated by the bag filter 3 is sent into a sieve 4, classified therein, and divided into oversize particles and undersize particles of ground graphite.

The oversize particles 16 of ground graphite are returned into the impact grinder 2 together with the raw material graphite 11, and the above procedure is repeated.

The undersize particles 17 of ground graphite are sent into a classifier 5 to remove excessively ground graphite fine particles 19. Thereby, spherical graphite particles 18 according to the present invention are obtained.

Incidentally, feeding of air into the impact grinder 2 may be conducted by feeding, under pressure, air 12 using a fan provided at the feeding section of the grinder 2, or by sucking air 14 using a fan provided at the discharging section of the bag filter 3.

Thus, by treating graphite particles using the above continuous treatment apparatus into which an impact grinder is integrated, nearly spherical graphite particles according to the present invention can be obtained effectively.

In the above apparatus, it is possible to appropriately change the proportion of the oversize particles 16 of ground graphite, to be returned to the raw material graphite 11, in order to control the proportion of spherical graphite particles in the graphite particles obtained.

The raw material graphite used in order to obtain the graphite particles of the present invention may be natural graphite or artificial graphite.

The graphite particles of the present invention need to retain the function possessed by highly crystalline graphite. Therefore, the raw material graphite, when it is an artificial graphite, preferably has a high graphitization degree. There is preferred, for example, a graphite obtained by a graphitization treatment at 2,600° C. or more, or a graphite obtained by adding boron or the like to accelerate graphitization.

The crystallinity of raw material graphite is preferably 0.670 to 0.672 nm in terms of graphite lattice constant Co (002).

In the production process of the present invention, raw material graphite is processed by a relatively small impact. Therefore, when graphite of high crystallinity is used as a raw material, the high crystallinity of raw material graphite remains in the graphite particles obtained, without being impaired. That is, the lattice constant Co (002) of the graphite particles after grinding remains at 0.670 to 0.672 nm.

The graphite particles of the present invention have an average particle diameter of preferably 100 μm or less, more preferably 5 to 50 μm when used as an anode material for lithium ion secondary battery or as a separator material for fuel cell.

Graphite particles having an average particle diameter of 5 to 50 μm can be obtained easily by beforehand subjecting the raw material graphite to be fed into an impact grinder, to coarse grinding into particle diameters of 5 mm or less.

The degree of sphericity of graphite particles can be expressed by the length-to-breadth ratio of particle. Therefore, when, in an arbitrarily selected section of graphite particle, the two axes intersecting perpendicularly at the gravity center, which give the largest length-to-breadth ratio, show a length-to-breadth ratio of close to 1, the particle's external shape is close to a true sphere.

According to the present process for producing graphite particles, the graphite particles obtained can easily have a length-to-breadth ratio of 4 or less (1 to 4). The length-to-breadth ratio can be made 2 or less (1 to 2) by increasing the times of grinding treatment.

The graphite particles of the present invention are made spherical and therefore have a large tap density. While scaly graphite has a tap density of about 0.4 to 0.7 g/cc, the tap density of the present graphite particles can be increased up to 0.6 to 1.4 g/cc.

The graphite particles of the present invention are made spherical and each particle is low in anisotropy depending upon the degree of spheroidization. The low anisotropy is appreciated, for example, from the fact that when the graphite particles of the present invention are pressed into a molded material and electricity is allowed to flow through the molded material in the pressing direction to measure the specific resistance of the molded material, the specific resistance is ½ to ⅕ of the specific resistance of a molded material obtained in the same manner using scaly graphite.

Therefore, when the graphite particles of the present invention are pressed into a molded material, the molded material is low in orientation and accordingly low in anisotropy.

When the present graphite particles are used as an anode material for lithium ion secondary battery or as a separator material for fuel cell, it is not necessary to use only the spherical graphite particles of the present invention. For example, by, in producing graphite particles using the above-mentioned apparatus, appropriately changing the proportion of the oversize particles 16 of ground graphite to be returned to the raw material graphite 11, it is possible to obtain a graphite particles mixture wherein the proportion of highly spherical graphite particles (graphite particles small in length-to-breadth ratio) is small; and this graphite particles mixture can be used as an anode material, etc. It is also possible to use a mixture of the present graphite particles with graphite particles obtained by other grinding method.

When a mixture of spheroidized graphite particles with other graphite particles is used for various applications, the advantages and functions inherently possessed by the spherical graphite particles are exhibited as long as the spherical graphite particles of the present invention are present in the mixture in a proportion of about 10% by mass or more. Therefore, a graphite particles mixture containing the spherical graphite particles of the present invention in a proportion of 10% by mass or more, is included in the present invention.

EXAMPLES

The present invention is described more specifically below by way of Examples.

Measurement of properties was made as follows.

[Specific Resistance]

A given amount of a sample of graphite particles was placed in a polyvinyl chloride-made pipe having a sectional area of 2 cm², closed with a copper-made cover at one end. A copper-made cylinder was inserted into the pipe from the other end of the pipe, and the sample in the pipe was pressed at a given pressure. In this state, the sample was measured for thickness (t) using a slide calipers. Further, the electric resistance (R) between the copper-made cover and the copper-made cylinder was measured using an electric resistance tester, AX-115A produced by Adex Co. Specific resistance (SR) was calculated using the following formula.

$$SR=2R/t(\Omega \cdot cm)$$

[Lattice Constant Co (002)]

An X-ray diffractometer, XC-40H produced by Toshiba Corporation was used. A Cu-$K_\alpha$ line was monochromatized with Ni; a high-purity silicon was used as a standard substance; and measurement was made according to the Gakushin method.

[Tap Density]

A sample was placed in a 100-ml glass-made messcylinder, followed by tapping. When continued tapping gave no change in sample volume, the sample volume was measured. A value obtained by dividing the sample mass by the sample volume was taken as the tap density of the sample.

[Average Particle Diameter]

Measurement was made using a laser diffraction type particle size tester, SALD 1000 produced by Shimadzu Corporation.

[External Shape of Particle]

The external shape of a sample was observed using a scanning type electron microscope produced by Japan Electron Optical Laboratory.

[Inner Construction and Length/breadth of Particle]

A sample of graphite particles was embedded in a polyester resin; the resulting material was polished; the polished material was coated, at the surface, with Au in a small thickness; then, the inner construction of the graphite particles was observed using a field-emission type scanning electron microscope, S-4300 produced by Hitachi, Ltd. The image observed was analyzed by an Image analyzer, Luzex IIIU produced by K. K. Nireko to determine the length/breadth of the graphite particles.

Example 1

Graphite particles produced in China, having an average particle diameter of 3.3 mm in the AB plane direction and a lattice constant Co (002) of 0.6707 nm were used as a raw material graphite. A pin mill produced by Leche Co. was used as a grinder. When the rpm of the rotor of the pin mill reached 20,000, the raw material graphite was fed at a rate of 200 g/min by allowing the graphite to be carried by the suction wind generated by the grinder.

The outermost rotating pins were arranged on a circumference of 9.5 cm in diameter and their linear speed was about 100 m/sec.

The ground graphite particles were collected by a cyclone and a bag filter. The collected graphite particles were again fed into the grinder by allowing them to be carried by the above suction wind. This grinding operation was repeated 20 times in total to obtain spherical graphite particles.

The graphite particles obtained had the following properties.

Average particle diameter: 25.6 μm

Tap density: 0.99 g/cc

Lattice constant Co (002): 0.6707 nm

Specific resistance: 0.0043 Ω·cm (Pressing pressure: 30 MPa)

Figure 2:
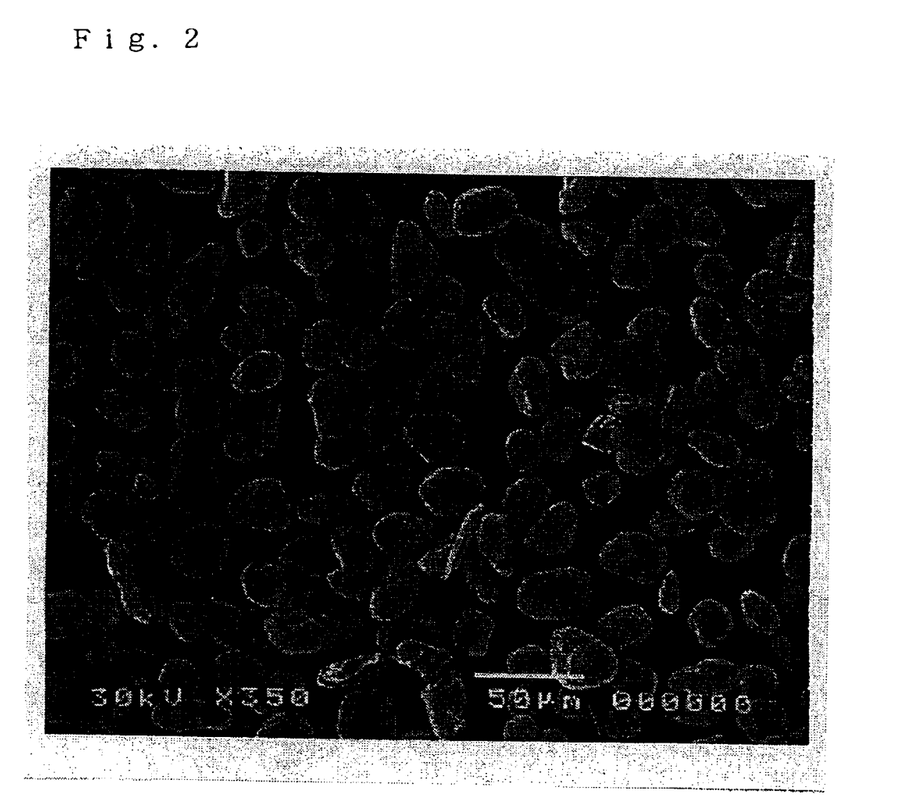
FIG. 2 is a microphotograph showing the external shape of the graphite particles produced in Example 1.

The graphite particles obtained had a spherical external shape as shown in FIG. 2.

Figure 3:
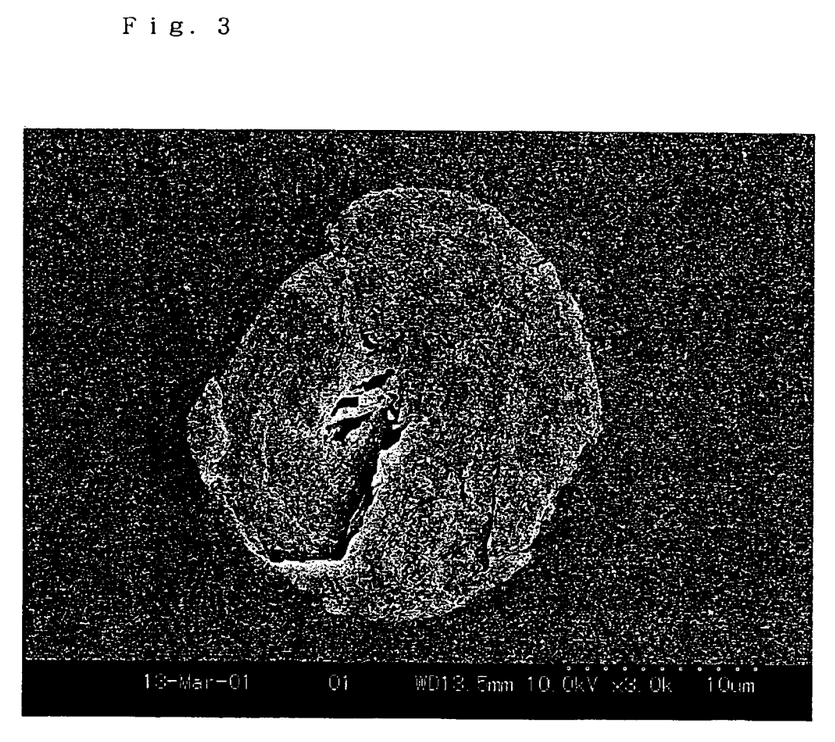
FIG. 3 is a microphotograph showing the internal shape of a graphite particle produced in Example 1.
Figure 4:
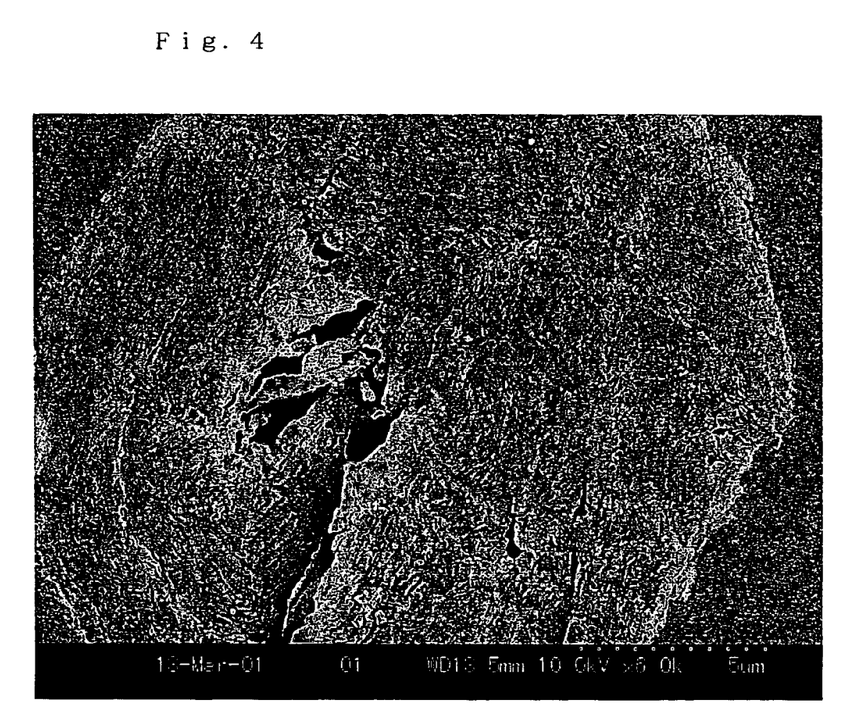
FIG. 4 is an enlarged microphotograph showing the internal shape of a graphite particle produced in Example 1.

The electron micrographs of the inner construction of the graphite particle are shown in FIG. 3 and FIG. 4. FIG. 3 is a photograph showing one whole graphite particle and FIG. 4 is a partly enlarged photograph thereof.

From these photographs it could be confirmed that each graphite particle had a bent laminate structure and that the surface of each graphite particle roughly agreed to the AB plane of graphite crystal. The length-to-breadth ratios were 2 or less and many ratios ranging from 1.2 to 1.6 were observed.

Using these spherical graphite particles, an electrode was produced under the conditions shown in Table 1 and tested for properties when used as an anode material for lithium ion secondary battery, under the conditions shown in Table 1. The results of the testing are shown in Table 2.

The load properties of the anode material are shown as discharge capacities when various discharge rates were used. 0.2 C, 1.0 C, 2.0 C and 3.0 C show that discharge was made in 5 hours, 1 hour, 30 minutes and 20 minutes, respectively.

Comparative Example 1

The same raw material graphite as used in Example 1 was ground using a jet mill produced by Condax Co. Fine grinding was achieved by one time of grinding; however, the particles obtained were scaly and had the following properties.

Average particle diameter: 8.71 μm

Tap density: 0.47 g/cc

Lattice constant Co (002): 0.6707 nm

Specific resistance: 0.0135 Ω·cm (Pressing pressure: 30 MPa)

Using these scaly graphite particles, an electrode was produced under the conditions shown in Table 1 and tested for properties when used as an anode material for lithium ion secondary battery, under the conditions shown in Table 1. The results of the testing are shown in Table 2.

TABLE 1

| Conditions for testing of anode materials for lithium ion secondary battery | |
|---|---|
| Cell | Two electrodes (reference electrode: metal lithium) |
| Sample amount | 30 mg |
| Electrode area | 2.5 cm² |
| Binder | PVDF: 9% by mass |
| Solvent used for preparation of graphite slurry | 1-Methyl-2-pyrrolidone |
| Drying conditions | 130° C. × 5 hr, in vacuum |
| Electrolyte, concentration | LiPF$_6$, 1 mol/l |
| Solvent system | EC/DMC = ½ (by volume) |
| During constant-current charge | |
| Current | 1 mA |
| Current density | 0.4 mA/cm² |
| During constant-voltage charge | |
| Voltage | 1 mV |
| Time | 1 hr |
| Measurement range of discharge capacity | 1 mV to 1.5 V |

TABLE 2

Results of testing of anode materials

| | Example 1 | Comparative Example 1 |
|---|---|---|
| First charge-discharge test result | | |
| Charge capacity (mAh/g) | 402 | 437 |
| Discharge capacity (mAh/g) | 365 | 365 |
| Coulomb efficiency (%) | 90.8 | 83.5 |
| Test results of load properties | | |
| Electrode density (g/cc) | 1.5 | 1.5 |
| First charge-discharge 0.2 C discharge capacity (mAh/g) | 363 | 364 |
| Second charge-discharge 0.2 C discharge capacity (mAh/g) | 363 | 364 |
| Third charge-discharge 1.0 C discharge capacity (mAh/g) | 365 | 363 |
| Fourth charge-discharge 2.0 C discharge capacity (mAh/g) | 352 | 320 |
| Fifth charge-discharge 3.0 C discharge capacity (mAh/g) | 337 | 299 |

The spherical graphite particles of Example 1, as compared with the scaly graphite particles of Comparative Example 1, can be evaluated as follows.

The graphite particles of Example 1 have a bent laminate structure when their inner construction is observed, and are low in anisotropy of each particle.

When their external shape is observed, the graphite particles of Example 1 are spherical and have a small length-to-breadth ratio and, therefore, have a high tap density. Accordingly, a molded material produced using the spherical graphite particles of the present invention, hardly gives rise to orientation.

In fact, the specific resistance of the graphite particles of Example 1 in a pressed state is smaller than ⅓ of the specific resistance of the scaly graphite particles of Comparative Example 1 in a pressed state.

When the spherical graphite particles of Example 1 were used as an anode material for lithium ion secondary battery, reduction in discharge capacity was small even in quick discharge. This indicates that the graphite layer of anode is low in anisotropy and is high in conductivity in the thickness direction.

Example 2

Graphite particles produced in Brazil, having an average particle diameter of 0.3 mm in the AB plane direction and a lattice constant Co (002) of 0.6708 nm were used as a raw material graphite. As a grinder, there was used the same pin mill (produced by Leche Co.) as used in Example 1 except that the rotor (pin rotor) of the pin mill was changed to an edge rotor having triangular teeth.

The triangular teeth were arranged coaxially with the edges directed to the center of the rotor and with each two adjacent triangular teeth of the outermost circumference being apart so as to form a gap of 2 mm. The diameter of the outermost circumference was 8.0 cm. In ordinary grinding, a strainer is provided near the circumference of the rotor; however, no strainer was provided in this Example.

The inlet and the outlet of the pin mill were connected to each other by a pipe. Thereby, the air current generated by the rotation of the rotor is returned from the outlet to the inlet via the pipe and air is circulated. As a result, the raw material graphite is circulated through the grinder and the pipe together with the gas current, and grinding is conducted repeatedly.

150 g of the raw material graphite was placed in the grinder, and grinding was conducted at 10,000 rpm for 60 seconds.

The properties of the graphite particles obtained are shown below.

Average particle diameter: 20.3 μm

Tap density: 1.02 g/cc

Lattice constant Co (002): 0.6708 nm

Specific resistance: 0.0045 Ω·cm (Pressing pressure: 30 MPa)

Figure 5:
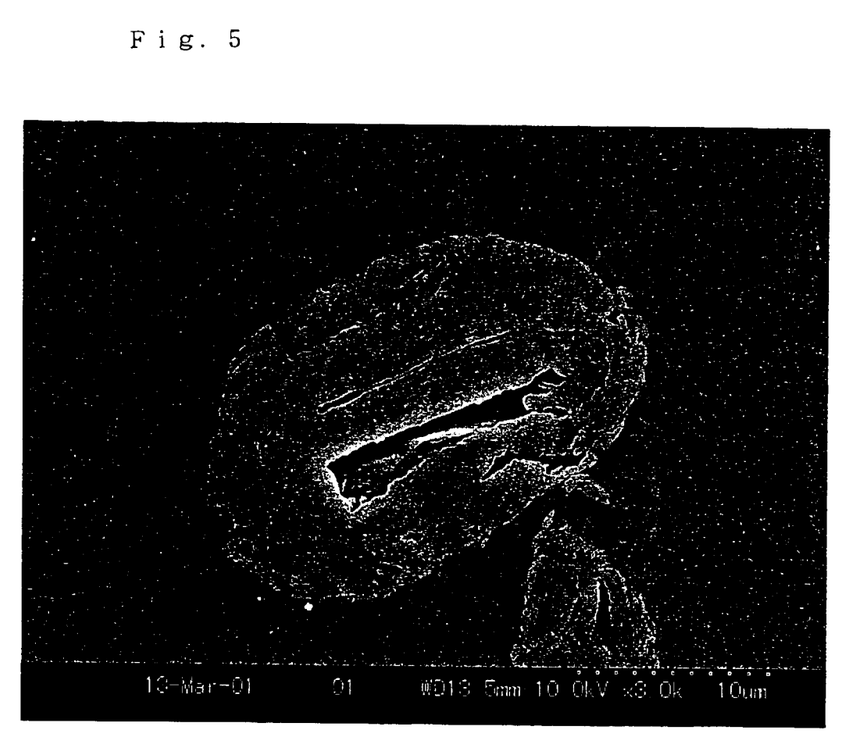
FIG. 5 is a microphotograph showing the internal shape of a graphite particle produced in Example 2.
Figure 6:
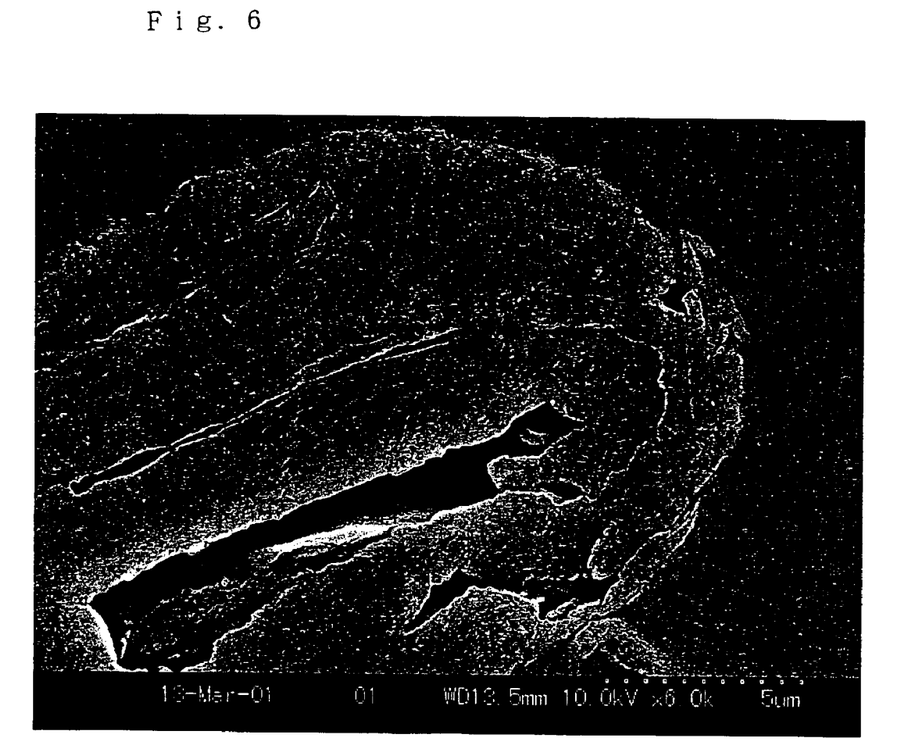
FIG. 6 is an enlarged microphotograph showing the internal shape of a graphite particle produced in Example 2.

The electron micrographs of the inner construction of the graphite particles are shown in FIG. 5 and FIG. 6. As in Example 1, it was confirmed that each graphite particle had a bent laminate structure and that the surface of each graphite particle roughly agreed to the AB plane of graphite crystal. The length-to-breadth ratios were 2 or less and many ratios ranging from 1.2 to 1.7 were observed.

Application Example 1

400 g of the spherical graphite particles obtained in Example 1 and 200 g of a novolac type phenolic resin (melting-starting temperature: 95° C.) produced by Gunei kagaku Kogyosha were placed in a Henschel mixer, 10 B produced by Mitsui Mining Co., Ltd. The agitating blades of the mixer were rotated at 3,200 rpm for 10 minutes to conduct mixing and kneading. During this period, the sample temperature increased from room temperature to 120° C.

Then, cooling was made and the mixer rotation was decreased to 1,600 rpm, and agitation was made at 110° C. for 2 minutes to obtain granules having an average particle diameter of about 100 μm.

The granules were molded at 200° C. at 10 MPa using a press, PY-50EA produced by Kodaira Seisakusho, to obtain a molded material of 120×100×1 mm for fuel cell separator. The molded material had a density of 2.00 g/cc, a three-point bending strength of 62 MPa as measured by JIS K 6911-1979, a contact resistance of 2.0 Ω·cm², and a helium leakage volume of zero.

Incidentally, the contact resistance is a resistance per unit sectional area of the molded material when the molded material is interposed between electrodes and electricity is allowed to pass through the electrodes, and is a resistance in the thickness direction of the molded material, including the contact resistance with the electrodes.

Comparative Application Example 1

Using the scaly graphite particles obtained in Comparative Example 1, a molded material for fuel cell separator was obtained in the same manner as in Application Example 1.

The molded material had a density of 1.95 g/cc, a three-point bending strength of 63 MPa, a contact resistance of 10.8 Ω·cm², and a helium leakage volume of zero.

When the molded material produced from the spherical graphite particles of Application Example 1 and the molded material produced from the scaly graphite particles of Comparative Application Example 2 are compared, the molded material for fuel cell separator, produced from the spherical graphite particles of the present invention has a high density, a high bending strength, a gas-shielding property and a high conductivity.

What is claimed is:

1. Graphite comprising graphite particles wherein
    (i) said graphite particles have an average particle diameter of 5 to 50 μm,
    (ii) said graphite particles have a nearly spherical shape having a length-to-breadth ratio of 2 or less, and
    wherein each particle consists essentially of one nearly spherically bent laminate structure which is curved along the circumference of the surface of said particles and the crystal plane at each surface of said particles is approximately an AB plane.

2. Graphite according to claim 1, wherein the graphite particles have a lattice constant Co (002) of 0.670 to 0.672 nm as measured by an X-ray diffractometer.

3. Graphite according to claim 1, having a tap density of 0.6 to 1.4 g/cm³.

4. A mixture which comprises the graphite as claimed in claim 1, in amount of 10% by mass or more, wherein the mixture has an average particle diameter of 100 μm or less.

5. A mixture comprising the graphite as claimed in claim 2, in amount of 10% by mass or more, wherein the mixture has an average particle diameter of 100 μm or less.

6. A mixture comprising the graphite as claimed in claim 3, in amount of 10% by mass or more, wherein the mixture has an average particle diameter of 100 μm or less.

7. A process for producing graphite comprising graphite particles, said process comprising:
    feeding, into an impact grinder having a linear speed of rotating hammers or pins of 50–200 m/sec, graphite particles having an average particle diameter of 5 mm or less together with a gas current to apply an impact to said graphite particles
    allowing said graphite particles to be accompanied by gas current to form, by a compression force, one nearly spherically bent laminate structure inside each graphite particle to obtain said graphite,
    wherein said graphite particles have an average particle diameter of 100 μm or less,
    said graphite particles have a nearly spherical shape having a length-to-breadth ratio of 2 or less, and
    wherein each particle consists essentially of one nearly spherically bent laminate structure which is curved alone the circumference of the surface of said particles and the crystal plane at each surface of said particles is approximately an AB plane.

* * * * *